United States Patent

[11] 3,574,366

| [72] | Inventor | Lewis D. Thostenson<br>Hawthorne, Calif. |
|---|---|---|
| [21] | Appl. No. | 844,074 |
| [22] | Filed | July 23, 1969 |
| [45] | Patented | Apr. 13, 1971 |
| [73] | Assignee | Instrument Systems Corporation |

[54] SPLINE LINER
6 Claims, 6 Drawing Figs.

[52] U.S. Cl. ................................................ 287/53,
74/230.17
[51] Int. Cl. ................................................ F16d 1/06
[50] Field of Search .......................................... 287/53 (S),
52.05, 53 (LK), 53, 52, 52.04; 64/9, 14

[56] References Cited
UNITED STATES PATENTS

| 705,792 | 7/1902 | Schlacks | 287/52.05 |
| 1,683,806 | 9/1928 | Richards, Jr. | 287/52X |
| 1,812,226 | 6/1931 | Walker | 287/52.05X |
| 1,861,640 | 6/1932 | McCabe | 287/53SUX |
| 2,089,168 | 8/1937 | Brown | 287/52.05 |
| 2,508,832 | 5/1950 | McAninch | 287/52X |
| 2,514,675 | 7/1950 | Shafter | 287/52X |
| 3,066,503 | 12/1962 | Fleming et al. | 64/14X |
| 3,250,553 | 5/1966 | Detwiler | 287/52.05 |

FOREIGN PATENTS

| 827,277 | 1/1952 | Germany | 64/14 |
| 763,157 | 12/1956 | Great Britain | 64/14 |

Primary Examiner—David J. Williamowsky
Assistant Examiner—Andrew V. Kundrat
Attorney—Harris, Kiech, Russell and Kern ABSTRACT: A splined connection between inner and outer members including liners between the splines on the two members. The liners are made of a material capable of withstanding torque loads which fluctuate at high frequencies, whereby the splined members themselves may be made of die cast aluminum alloys for economy. The splined portion of the inner member is longitudinally tapered while the splined portion of the outer member is untapered. The spline liners are internally tapered to match the inner member and are externally untapered to match the outer member so that the outer member may slide longitudinally on the spline liners. This permits die casting the splines on the inner member with sufficient draft for easy removal. The use of liners between splined members in this manner is particularly useful in a variable speed transmission wherein the outer member comprises the movable face of a V-belt pulley which is constantly shifted back and forth longitudinally to vary the pitch diameter of the pulley.

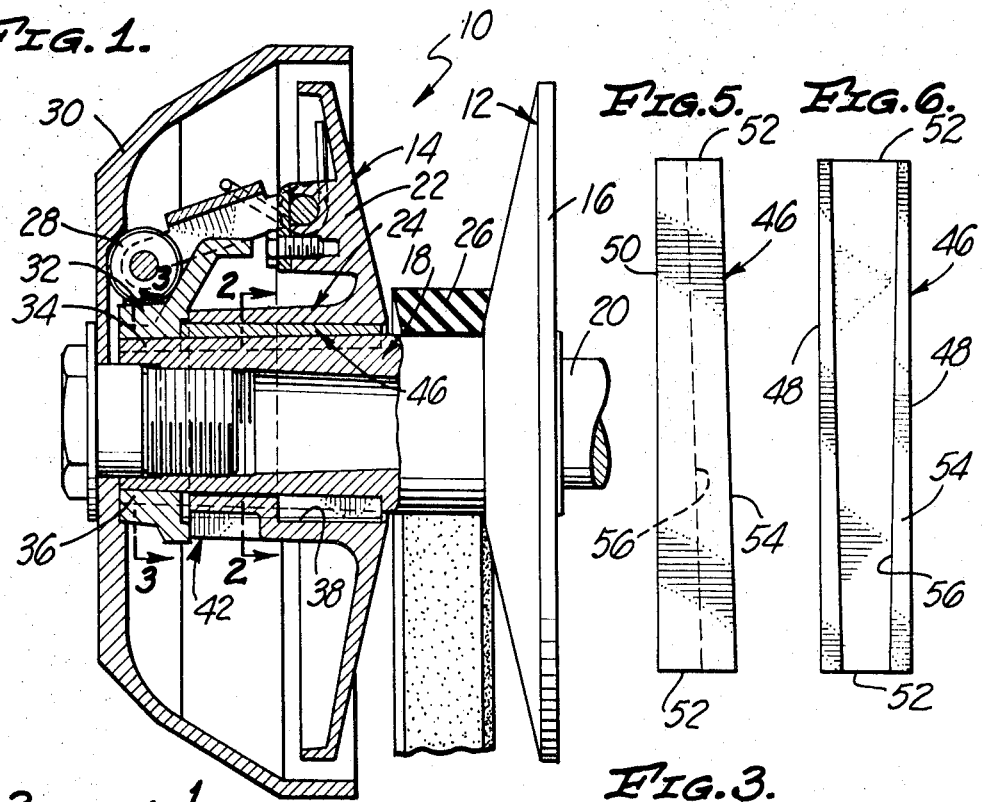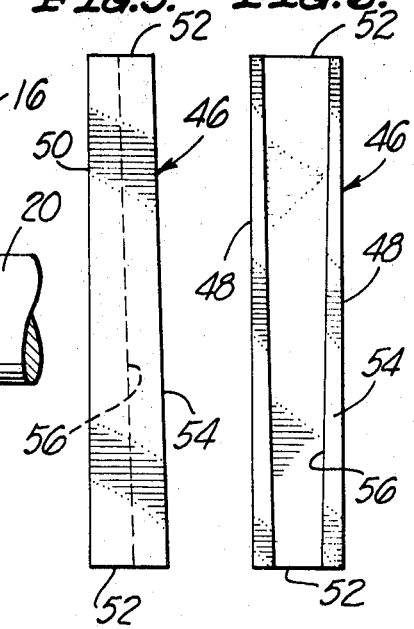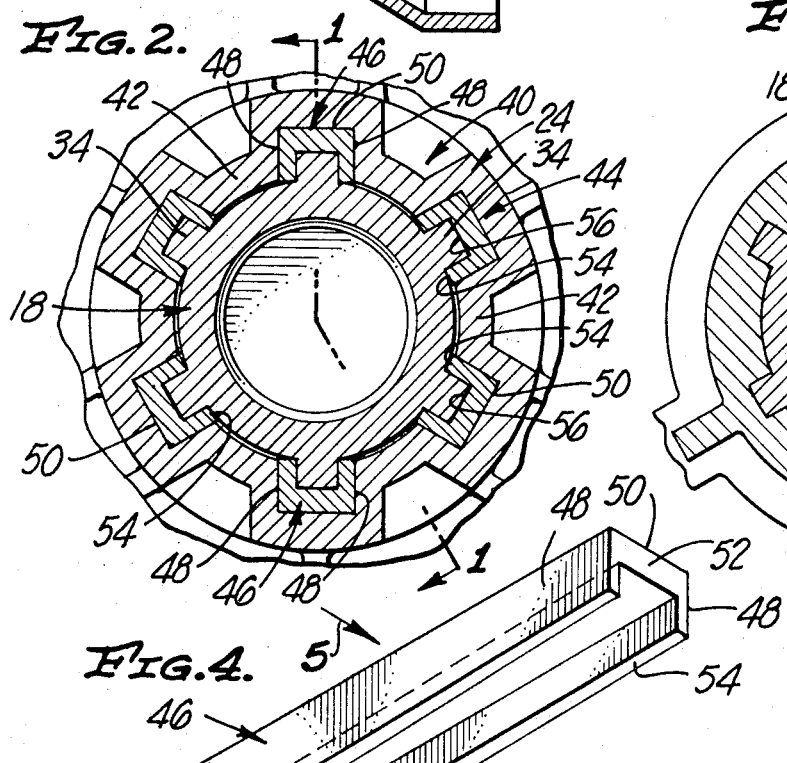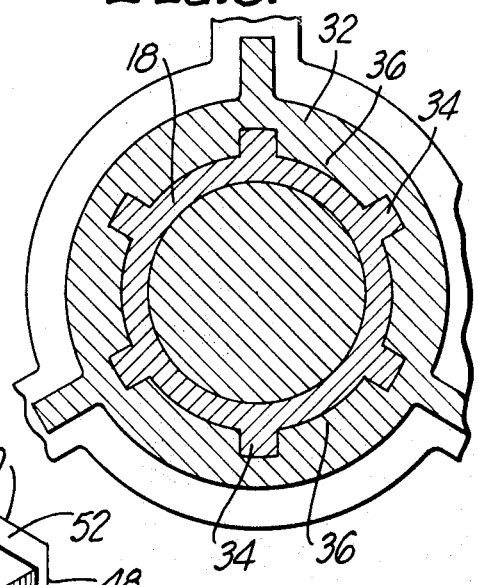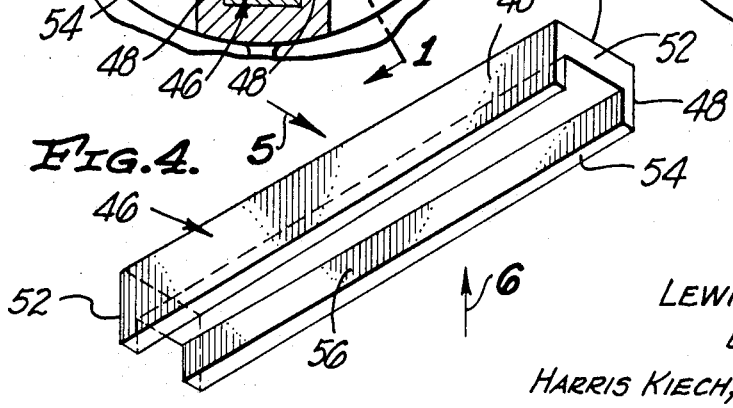

SPLINE LINER

BACKGROUND OF INVENTION

The present invention relates in general to splined connections between members and, more particularly, to splined connections wherein one of the members must be moved back and forth constantly in the longitudinal direction. As an example, the invention is particularly applicable to a splined connection between the fixed and movable faces of a V-belt pulley for a variable speed transmission of the type disclosed in U.S. Pat. No. 3,266,330, issued Aug. 16, 1966 to Louis C. Galleher. Characteristically, the fixed face of the pulley is provided with a hub on which a hub of the movable face is longitudinally slidable to vary the pitch diameter, there being a torque-transmitting connection between the two hubs. In the construction of the Galleher patent, this torque-transmitting connection comprises circumferentially spaced, longitudinal pins which are carried by one of the hubs and relative to which the other hub is longitudinally slidable. Such a torque-transmitting connection is quite expensive to manufacture.

In the past, splined torque-transmitting connections between the hubs of the fixed and movable faces have not been satisfactory due to deformation of the splines under the influence of high frequency torsional vibrations resulting from high frequency torque fluctuations. Such spline damage is concentrated in areas corresponding to frequently used longitudinal positions of the movable face. Problems of this nature may be eliminated or minimized by making the fixed and movable pulley faces and their splined hubs of materials capable of resisting the applied stresses, or by providing these parts with splined inserts of such materials, but any construction of this nature is objectionable as being expensive also.

SUMMARY AND OBJECTS OF INVENTION

With the foregoing as background, a primary object of the invention is to provide splined members which may be made of relatively inexpensive materials, such as die cast aluminum alloys, and which are equipped therebetween with spline liner means of materials capable of withstanding the stresses involved, the liner means being complementary to and engaging the splined portions of the two members and serving to transmit torque therebetween.

The foregoing provides a relatively inexpensive splined connection since the two parts to be connected in torque-transmitting relation, such as the hereinbefore mentioned fixed and movable pulley faces and their hubs, may be die cast from aluminum alloys, for example. The spline liner means is made from a material which will withstand the high frequency torsional vibrations involved in such a splined connection, an example being sintered bronze. However, various molded plastics and specially treated metals may also be used.

An important object of the invention is to provide a construction of the foregoing nature wherein the splined portion of the inner member is longitudinally tapered and the splined portion of the outer member is longitudinally untapered, the spline liner means having inner tapered and outer untapered portions respectively complementary to and engaging the tapered and untapered splined portions of the inner and outer members, whereby the outer member may slide longitudinally on the spline liner means, as required by a movable pulley face and its hub.

An important feature of the foregoing construction is that the longitudinally tapered splined portion of the inner member provides the draft necessary for its removal from the die, which taper is then compensated for by the liner means. Consequently, no machining of the splines of the inner member, which may be the hub of the fixed pulley face mentioned, is required, which is an important feature.

The variable speed transmission to which the present invention is particularly applicable also includes an outer spider which is rotatable with the hub of the fixed pulley face and which is longitudinally fixed with respect thereto. This spider, which is located at the smaller end of the tapered splined hub of the fixed pulley face and acts as a stop means for limiting longitudinal movement of the movable pulley face, has an internal splined portion which is longitudinally tapered and which is complementary to and in engagement with the smaller end of the longitudinally tapered splined portion of the hub of the fixed pulley face. This tapered internally splined portion of the spider provides draft for removal from its die and no machining of the splines thereon is necessary.

Thus, with the foregoing construction it is unnecessary to machine the tapered splines on the hub of the fixed pulley face and on the spider. Only the internal splines on the hub of the movable pulley face need to be machined, which is an important feature since it minimizes manufacturing expense considerably.

Another object of the invention is to provide a spline liner means which utilizes individual, channel-shaped spline liners having inner tapered portions respectively complementary to and engaging the tapered splines of the inner member, and having outer untapered portions respectively complementary to and engaging the untapered splines of the outer member.

The foregoing objects, advantages, features and results of the present invention, together with various other objects, advantages, features and results thereof which will be evident to those skilled in the spline art in the light of this disclosure, may be achieved with the exemplary embodiment of the invention described in detail hereinafter and illustrated in the accompanying drawing.

DESCRIPTION OF DRAWING

In the drawing:

FIG. 1 is a longitudinal sectional view, partially in elevation, of a variable pitch V-belt pulley which embodies the spline liner means of the invention, FIG. 1 being taken as indicated by the arrowed line 1-1 of FIG. 2;

FIG. 2 is an enlarged, fragmentary, transverse sectional view taken as indicated by the arrowed line 2-2 of FIG. 1;

FIG. 3 is a view similar to FIG. 2 but taken along the arrowed line 3-3 of FIG. 1;

FIG. 4 is an enlarged, isometric view of a spline liner of the invention; and

FIGS. 5 and 6 are elevational views of the spline liner of FIG. 4 respectively taken as indicated by the arrows 5 and 6 of FIG. 4.

DESCRIPTION OF EXEMPLARY EMBODIMENT OF INVENTION

Referring to the drawing, and particularly to FIG. 1 thereof, designated generally therein by the numeral 10 is a variable pitch, V-belt pulley which is similar in construction and operation to the pulley 10 of the aforementioned Galleher patent. Consequently, the pulley 10 will be considered herein only to the extent necessary for an understanding of the present invention. If more information is desired, attention is directed to the Galleher patent, which is incorporated herein by reference.

Utilizing the language of the appended claims, the pulley 10 includes inner and outer members 12 and 14 having generally complementary splines or splined portions to be described. In the particular construction illustrated, the inner member 12 comprises a fixed V-belt pulley face 16 having an integral hub 18, this member being suitably fixed on a shaft 20. The outer member 14 comprises a longitudinally movable V-belt pulley face 22 having an integral hub 24 slidable longitudinally of the hub 18 of the fixed face 16 to vary the longitudinal spacing between the movable and fixed faces so as to vary the pitch diameter of the pulley 10 for a V-belt 26 trained therearound.

As disclosed in more detail in the aforementioned Galleher patent, the longitudinal position of the movable face 22 is determined by the cooperation between circumferentially spaced pivoted rollers 28, only one of which is visible, carried by the movable face, and a ramp 30 and a spider 32 rotatable with the fixed face.

The present invention resides in the splined relationship between the fixed hub 18, the movable hub 24 and the spider 32, which is fixed with respect to the fixed hub. This splined relationship will now be considered in detail.

The movable hub 24 is movable axially of the fixed hub 18 between two axially spaced stop means one of which is formed by the spider 32. The other stop means is formed by the fixed pulley face 16.

The fixed hub 18 is provided with an externally splined portion, composed of circumferentially spaced longitudinal splines 34, which tapers or converges, toward the left, as viewed in FIG. 1. More particularly, the splines 34 taper toward the left in circumferential width and in outside diameter, but are constant in radial thickness. With this construction, the splines 34 have substantially uniform strength in the longitudinal direction, but nevertheless provide the draft necessary to permit easy removal thereof from a die in which the fixed face 16 and its integral hub 18 are cast as one piece. As hereinbefore discussed, this tapered construction of the splined portion of the fixed hub 18 is an important feature of the invention since it minimizes the cost of the inner member 12 composed of the fixed face 16 and its hub 18.

The spider 32 is provided with an internal splined portion, composed of splines 36, FIG. 3, which is complementary to the externally splined portion of the fixed hub 18 and which is thus also tapered to the left, as viewed in FIG. 1. With this construction, the spider 32 is fixed in position relative to the hub 18 both longitudinally and circumferentially, and the tapered splined portion represented by the splines 36 also provides the draft required for ready removal from the die in which the spider is cast.

Thus, the tapered splined portions represented by the splines 34 and 36 permit die casting of the inner member 12, comprising the fixed pulley face 16 and its hub 18, and of the spider 32, from any suitable materials, such as aluminum alloys, with no machining of either of these parts being necessary, which is an important feature of the invention since it greatly reduces manufacturing expense.

As viewed in FIG. 1, the movable hub 24 is provided in its right end with a cylindrical axial cavity 38 and is provided at its left end with a straight, i.e., longitudinally untapered, splined portion 40 made up of straight, i.e., longitudinally untapered, splines 42. These splines, and the cylindrical cavity 38, are machined after die casting the movable face 22 and its hub 24, these being the only machining operations required for the members 12 and 14 and the spider 32, which is an important feature.

The invention provides spline liner means 44 between the tapered splines 34 and the straight splines 42, which permits longitudinal movement of the movable hub 24 relative to the fixed hub 18, despite the taper of the splines 34 on the fixed hub 18. In the construction illustrated, the spline liner means 44 comprises individual spline liners 46 which are complementary to and engaged by both the tapered splines 34 and the straight splines 42. Thus, they provide the spline liner means 44 with concentric inner tapered and outer untapered portions respectively complementary to and engaging the tapered and untapered splined portions of the inner, fixed hub 18 and the outer, movable hub 24.

More particularly, each spline liner 46 is generally channel shaped in cross section and fits over one of the tapered splines 34 and between two of the straight splines 42. Each spline liner 46, as best shown in FIGS. 4 to 6, comprises a four-sided elongated member having longitudinally extending lateral surfaces 48 which are parallel to provide the liner with a longitudinally constant width. The lateral surfaces 48 are interconnected by a radially outer surface 50 which is perpendicular to the surfaces 48, and to end faces 52 of the liner. The lateral surfaces 48 and the outer surface 50 of each liner make it a straight, i.e., longitudinally untapered, spline for engagement with the corresponding straight splines 42 so that the movable hub 24 can move longitudinally along the various spline liners, which is an important feature.

Each spline liner 46 also includes a radially inner surface 54 which converges toward the radially outer surface 50 from left to right, as viewed in FIGS. 1 and 4, to provide the spline liner with a longitudinally varying thickness corresponding to the longitudinally varying external and root diameters of the tapered splines 34. Formed in the inner surface 54 of each spline liner 46 is a longitudinally extending spline groove 56 having a longitudinally constant depth, to match the longitudinally constant height or thickness of the tapered splines 34, and having a width converging or tapering from right to left, as viewed in FIGS. 1 and 4, to match the longitudinal taper of the tapered splines 34.

With the foregoing construction, the spline liners 46 fit and separate the tapered splines 34 and the straight splines 42, whereby the movable hub 24 may move back and forth longitudinally freely, while still maintaining the cost advantages of tapered splines on the fixed hub 18 and the spider 32, which are important features of the invention.

As previously mentioned, the inner and outer members 12 and 14 and the spider 32 are all preferably die cast from aluminum alloys, or the like, to minimize expense. The spline liners 46 are formed of a material suitable for the stresses involved, which include high frequency torsional vibrations, sintered bronze being an example of such a material. However, various other materials, such as molded plastics, specially treated metals, and the like, may be used.

Although an exemplary embodiment of the invention has been disclosed for purposes of illustration, it will be understood that various changes, modifications and substitutions may be incorporated in such embodiment.

I claim:

1. A spline liner comprising a four-sided elongated member having longitudinally extending, lateral surfaces which are parallel to provide said member with a longitudinally constant width, said member having longitudinally extending, radially spaced surfaces which converge from one end of said member to the other to provide it with a longitudinally varying thickness and which interconnect and are perpendicular to said lateral surfaces, one of said radially spaced surfaces being provided therein with a longitudinally extending spline groove having a longitudinally constant depth and having a width converging from said other end of said member to said one end thereof.

2. A spline liner as defined in claim 1 wherein said member has end faces perpendicular to said lateral surfaces and to the other of said radially spaced surfaces.

3. In combination:
   a. inner and outer members having generally complementary splined portions;
   b. the splined portion of said inner member being longitudinally tapered;
   c. the splined portion of said outer member having a longitudinally constant cross section; and
   d. spline liner means having concentric inner and outer portions respectively complementary to and engaging said splined portions of said inner and outer members, said spline liner means separating said inner and outer members.

4. The combination set forth in claim 3 wherein said outer member is longitudinally slidable on said spline liner means.

5. The combination of claim 4 including two longitudinally spaced stop means for limiting longitudinal sliding movement of said outer member.

6. The combination set forth in claim 5 wherein one of said stop means comprises another outer member axially aligned with the first outer member mentioned and having a longitudinally tapered splined portion complementary to and engaging said tapered splined portion of said inner member.